US012186607B2

(12) United States Patent
Newcomer et al.

(10) Patent No.: US 12,186,607 B2
(45) Date of Patent: Jan. 7, 2025

(54) ULLAGE PRESSURE-DRIVEN VALVE FOR FIRE SUPPRESSION

(71) Applicant: Kidde Technologies, Inc., Wilson, NC (US)

(72) Inventors: Matthew Allen Newcomer, Asheville, NC (US); John Wright Porterfield, Jr., Rolesville, NC (US); David William Frasure, Wilson, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 0 days.

(21) Appl. No.: 18/522,826

(22) Filed: Nov. 29, 2023

(65) Prior Publication Data

US 2024/0091576 A1 Mar. 21, 2024

Related U.S. Application Data

(62) Division of application No. 17/118,827, filed on Dec. 11, 2020, now Pat. No. 11,865,385.

(51) Int. Cl.
*A62C 35/13* (2006.01)
*A62C 35/02* (2006.01)

(52) U.S. Cl.
CPC ............ *A62C 35/023* (2013.01); *A62C 35/13* (2013.01)

(58) Field of Classification Search
CPC .............................. A62C 35/023; A62C 35/13
USPC ............................................................ 169/29
See application file for complete search history.

(56) References Cited

U.S. PATENT DOCUMENTS 4,492,103 A * 1/1985 Naumann .............. B21D 53/80 72/464
4,620,598 A * 11/1986 Reeder ................... A62C 13/64 169/30
4,691,736 A 9/1987 Kowalski
4,830,052 A * 5/1989 Oberlin ............... F16K 17/1626 137/68.24
5,230,531 A * 7/1993 Hamilton .................. F42B 3/04 222/5
5,458,202 A * 10/1995 Fellows ................. A62C 37/46 169/58
5,676,190 A * 10/1997 Matsumoto ............ A62C 17/00 222/5

(Continued)

FOREIGN PATENT DOCUMENTS

KR 101212984 B1 12/2012

OTHER PUBLICATIONS

Extended European Search Report for EP Application No. 21210654.6, dated May 9, 2022, pp. 1-7.

*Primary Examiner* — Chee-Chong Lee
(74) *Attorney, Agent, or Firm* — CANTOR COLBURN LLP

(57) ABSTRACT

A fire suppression system includes a feed port and a channel to couple the feed port to an actuation chamber. A solenoid valve controllably blocks a connection between the feed port and the channel. Pressure from the feed port builds up in the actuation chamber based on the solenoid valve unblocking the connection. A piston is in communication with the actuation chamber. The system also includes an inlet port closed off by a disc. The piston travels through the inlet port and burst the disc based on the pressure in the actuation chamber. An outlet port is coupled to the inlet port.

8 Claims, 2 Drawing Sheets

(56) References Cited

U.S. PATENT DOCUMENTS

| | | | | | |
|---|---|---|---|---|---|
| 6,076,610 | A | * | 6/2000 | Zwergel | A62C 13/68<br>169/73 |
| 6,164,383 | A | * | 12/2000 | Thomas | A62C 37/36<br>169/61 |
| 7,281,672 | B2 | | 10/2007 | Karalis et al. | |
| 7,562,670 | B1 | | 7/2009 | Jones et al. | |
| 7,703,471 | B2 | | 4/2010 | Edwards | |
| 8,448,716 | B2 | | 5/2013 | Yoshida | |
| 9,539,452 | B2 | | 1/2017 | Frasure et al. | |
| 9,649,520 | B2 | | 5/2017 | Frasure et al. | |
| 2012/0152571 | A1 | | 6/2012 | Andreas | |
| 2016/0008646 | A1 | | 1/2016 | Frasure et al. | |
| 2022/0184437 | A1 | | 6/2022 | Newcomer et al. | |

* cited by examiner

ULLAGE PRESSURE-DRIVEN VALVE FOR FIRE SUPPRESSION

CROSS-REFERENCE TO RELATED APPLICATIONS

This application is a division of U.S. application Ser. No. 17/118,827 filed Dec. 11, 2020, the disclosure of which is incorporated herein by reference in its entirety.

BACKGROUND

Exemplary embodiments pertain to the art of fire suppression and, in particular, to an ullage pressure-driven valve for fire suppression.

Fire detection and suppression is an important function in many areas, including on commercial ground vehicles. When an overheat condition such as a fire is detected, a fire suppression system may be employed to extinguish the fire. Fire suppression systems generally involve the rapid discharge of a fire suppression agent. While a hand-held fire extinguisher may be used in some applications, fire suppression agent may be dispersed via plumbing or tubing in other applications, such as in commercial ground vehicles.

BRIEF DESCRIPTION

In one embodiment, a fire suppression system includes a feed port, and a channel to couple the feed port to an actuation chamber. A solenoid valve controllably blocks a connection between the feed port and the channel. Pressure from the feed port builds up in the actuation chamber based on the solenoid valve unblocking the connection. A piston is in communication with the actuation chamber, and an inlet port is closed off by a disc. The piston travels through the inlet port and burst the disc based on the pressure in the actuation chamber. An outlet port is coupled to the inlet port.

Additionally or alternatively, in this or other embodiments, the system also includes a container including a material and ullage, the ullage being space above the material in the container.

Additionally or alternatively, in this or other embodiments, the container is pressurized.

Additionally or alternatively, in this or other embodiments, the feed port is in communication with the ullage.

Additionally or alternatively, in this or other embodiments, pressure from the ullage is the pressure from the feed port that is channeled to the actuation chamber.

Additionally or alternatively, in this or other embodiments, the system also includes a siphon tube controllably coupled to the inlet port. The disc blocks communication between the siphon tube and the inlet port and the siphon tube reaches the material in the container.

Additionally or alternatively, in this or other embodiments, the siphon tube conveys the material from the container through the inlet port to the outlet port based on the piston bursting the disc.

Additionally or alternatively, in this or other embodiments, the piston includes a tip at a first end and a head, wider than the tip, at a second end opposite the first end. The tip bursts the disc and the head blocks entry of the material from the container and through the inlet port into the actuation chamber.

Additionally or alternatively, in this or other embodiments, the material is a fire suppression agent.

Additionally or alternatively, in this or other embodiments, the system also includes a controller to provide a signal to the solenoid value to unblock the connection between the feed port and the channel.

In another embodiment, a method of assembling a fire suppression system includes forming a feed port, and arranging a channel to couple the feed port to an actuation chamber. The method also includes configuring a solenoid valve to controllably block a connection between the feed port and the channel. Pressure from the feed port builds up in the actuation chamber based on the solenoid valve unblocking the connection. A piston is arranged in communication with the actuation chamber, and a disc is disposed to close off an inlet port. The piston travels through the inlet port and bursts the disc based on the pressure in the actuation chamber. An outlet port is coupled to the inlet port.

Additionally or alternatively, in this or other embodiments, the method also includes pressurizing a container that includes a material and ullage, the ullage being space above the material in the container.

Additionally or alternatively, in this or other embodiments, the forming the feed port includes arranging the feed port to be in communication with the ullage in the container.

Additionally or alternatively, in this or other embodiments, the method also includes disposing a filter between the feed port and the ullage to block the material from entering the feed port.

Additionally or alternatively, in this or other embodiments, the arranging the feed port includes creating a channel such that pressure from the ullage is the pressure from the feed port that is channeled to the actuation chamber.

Additionally or alternatively, in this or other embodiments, the method also includes controllably coupling a siphon tube to the inlet port, wherein the disc blocks communication between the siphon tube and the inlet port and the siphon tube reaches the material in the container.

Additionally or alternatively, in this or other embodiments, the controllably coupling the siphon tube includes disposing the siphon tube such that the siphon tube conveys the material from the container through the inlet port to the outlet port based on the piston bursting the disc.

Additionally or alternatively, in this or other embodiments, the piston includes a tip at a first end and a head, wider than the tip, at a second end opposite the first end, and the arranging the piston includes aligning the tip to burst the disc and the head to block entry of the material from the container and through the inlet port into the actuation chamber.

Additionally or alternatively, in this or other embodiments, the material is a fire suppression agent.

Additionally or alternatively, in this or other embodiments, the method also includes coupling a controller to the solenoid valve. This provides a signal to the solenoid value to unblock the connection between the feed port and the channel.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, a fire suppression system discharges fire suppression agent to extinguish a fire. Prior fire suppression systems in certain applications involve activation of the discharge by direct explosive impingement energy. Specifically, upon receiving an electronic signal, a device (e.g., squib, cartridge) provides explosive energy that is focused on a dome-shaped burst disc at the opening of the container of fire suppression agent. When the burst disc is ruptured by the explosive impingement energy, the fire suppression agent, which is under pressure, is rapidly discharged through a distribution system such as tubing with outlet nozzles.

Embodiments of the systems and methods detailed herein relate to an ullage pressure-driven valve for fire suppression. When material is added to a container (e.g., cylinder, bottle), ullage is the amount by which the container is unfilled with the material. Generally, ullage is understood to refer to the empty space (e.g., air) above the material in the container. According to the one or more embodiments, the material in the container that gives rise to the ullage is fire suppression agent. Further, the container is pressurized such that the ullage contains pressurized gas. Ullage pressure refers to this gas pressure. As described, a device is no longer needed to provide explosive energy to rupture the burst disc. Instead, ullage pressure in the container that holds the fire suppression agent is directed to cause the release of a piston with a tip that pierces the scored burst disc, allowing the fire suppression agent to flow.

Figure 1:
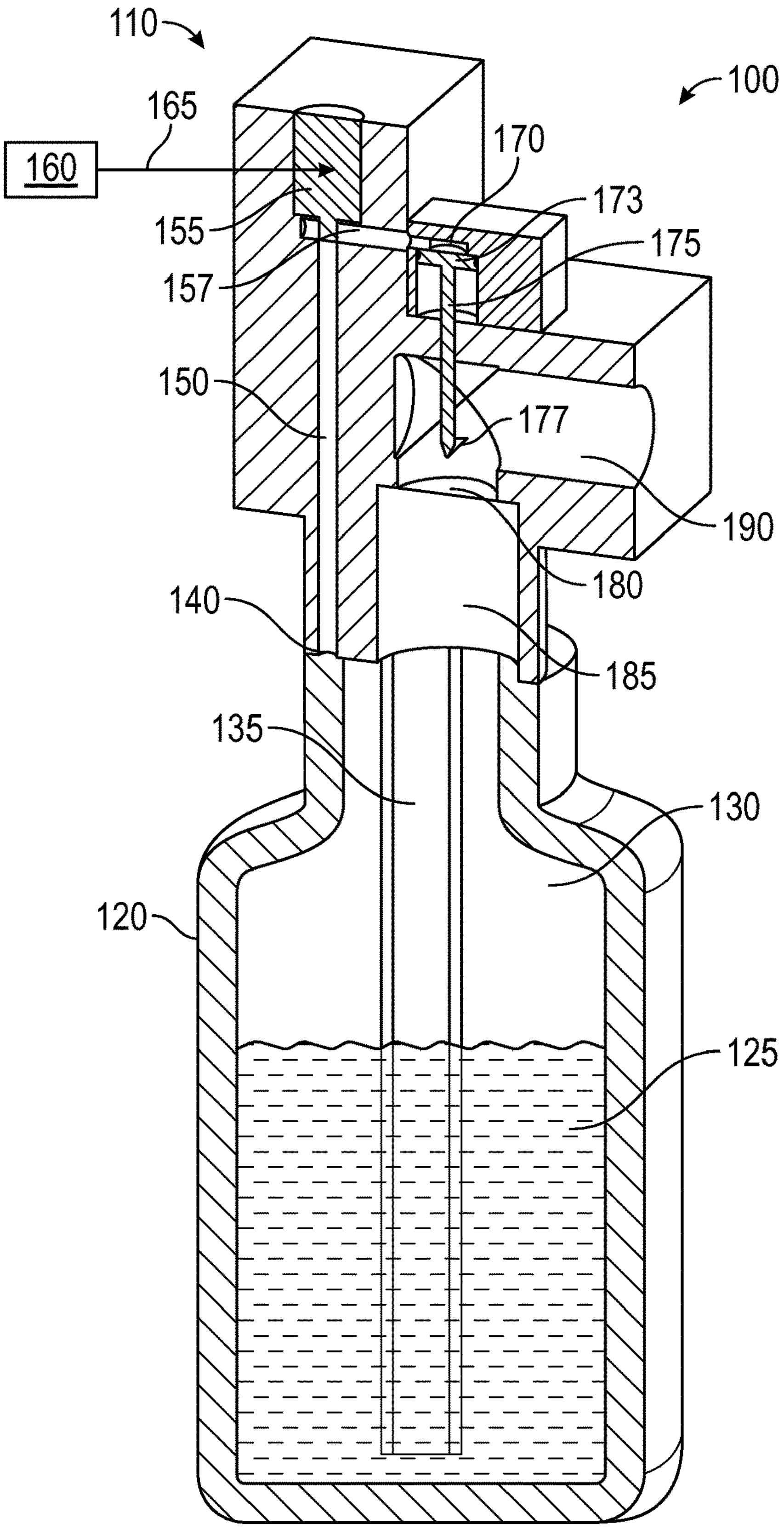
FIG. 1 is a cross-sectional view of aspects of a fire suppression system with an exemplary ullage pressure-driven valve according to one or more embodiments.

FIG. 1 is a cross-sectional view of aspects of a fire suppression system 100 with an exemplary ullage pressure-driven valve 110 according to one or more embodiments. A fire suppression system 100 may include a fire extinguisher, controller 160, sensors that detect the overheat condition, and a distribution system for the first suppression agent 125. The valve 110 that is part of the fire extinguisher is detailed in FIGS. 1 and 2. A container 120 (e.g., cylinder) is shown to include a fire suppression agent 125 with ullage 130 containing pressurized gas above. The fire suppression agent 125 may be a potassium bicarbonate-based dry chemical, for example. The dry chemical takes the physical form of a powder similar to baking soda. The container 120 is pressurized and, thus, the ullage 130 is pressurized. A siphon tube 135 extends into the container 120, as shown in the exemplary embodiment. This siphon tube 135 is connected to an inlet port 185 of the valve 110. According to an alternate embodiment in which the fire suppression system 100 is inverted, the siphon tube 135 may not be needed.

A disc 180 is disposed at the opening to the inlet port 185 to prevent the fire suppression agent from coming up through the inlet port 185 to the outlet port 190 until fire suppression is actuated. The disc 180, which may be referred to as a rupture disc or burst disc, for example, is a non-reclosing disc. According to an exemplary embodiment, the disc 180 is a burst disc of steel or nickel-bearing steel. The disc 180 may be scored according to exemplary embodiments. The disc 180 breaks open at a burst pressure to allow unrestricted flow of the fire suppression agent 125 via the siphon tube 135 and through the inlet port 185 into the outlet port 190 according to the mechanism detailed herein.

A controller 160 provides a signal 165 to a solenoid valve 155. The solenoid valve 155 is an electromechanically operated valve that moves up according to the exemplary arrangement shown in FIG. 1. However, according to alternate embodiments, the solenoid valve 155 may be arranged to rotate or move in a different direction based on the signal 165 from the controller 160. The controller 160 may provide the signal 165 based on a fire detection system or another input, for example. The movement of the solenoid valve 155 creates a path between the feed port 150 and the actuation chamber 170 that is blocked by the solenoid valve 155 in the closed position shown in FIG. 1. The feed port 150 has an opening to the ullage 130 and is pressurized by ullage pressure. A filter 140 (e.g., sintered disc) may be disposed at the opening of the feed port 150 to the ullage 130 in order to prevent any of the first suppression agent 125 from entering the feed port 150.

When the solenoid valve 155 moves, based on the signal 165 from the controller 160, the ullage pressure in the feed port 150 is channeled to the actuation chamber 170 via the channel 157. Pressure buildup in the actuation chamber 170 causes downward movement, according to the exemplary arrangement shown in FIG. 1, of the piston 175. The head 173 of the piston 175 is the widest part of the piston 175, as shown. This portion holds in the ullage pressure that reaches the actuation chamber 170 until that pressure is high enough to actuate the piston 175. According to exemplary embodiments, an O-ring may be placed around the head 173 of the piston 175. The O-ring creates a trapped volume in the actuation chamber 170 (i.e., prevents the leak of any pressure that is introduced via the channel 157) to ensure that the pressure buildup in the actuation chamber 170 is sufficient to act on the piston 175.

As shown, the piston 175 has a sharp tip 177, which is at the opposite end as the head 173. The downward movement of the piston 175 caused by sufficient pressure buildup in the actuation chamber 170 results in the tip 177 bursting the disc 180. Once the disc 180 is burst, fire suppression agent 125 in the pressurized container 120 is forced up through the siphon tube 135 and inlet port 185 and out through the outlet port 190. The fire suppression agent 125 is channeled to the output port 190 based on the head 173 of the piston 175 blocking the path to the actuation chamber 170, as shown in FIG. 2.

Figure 2:
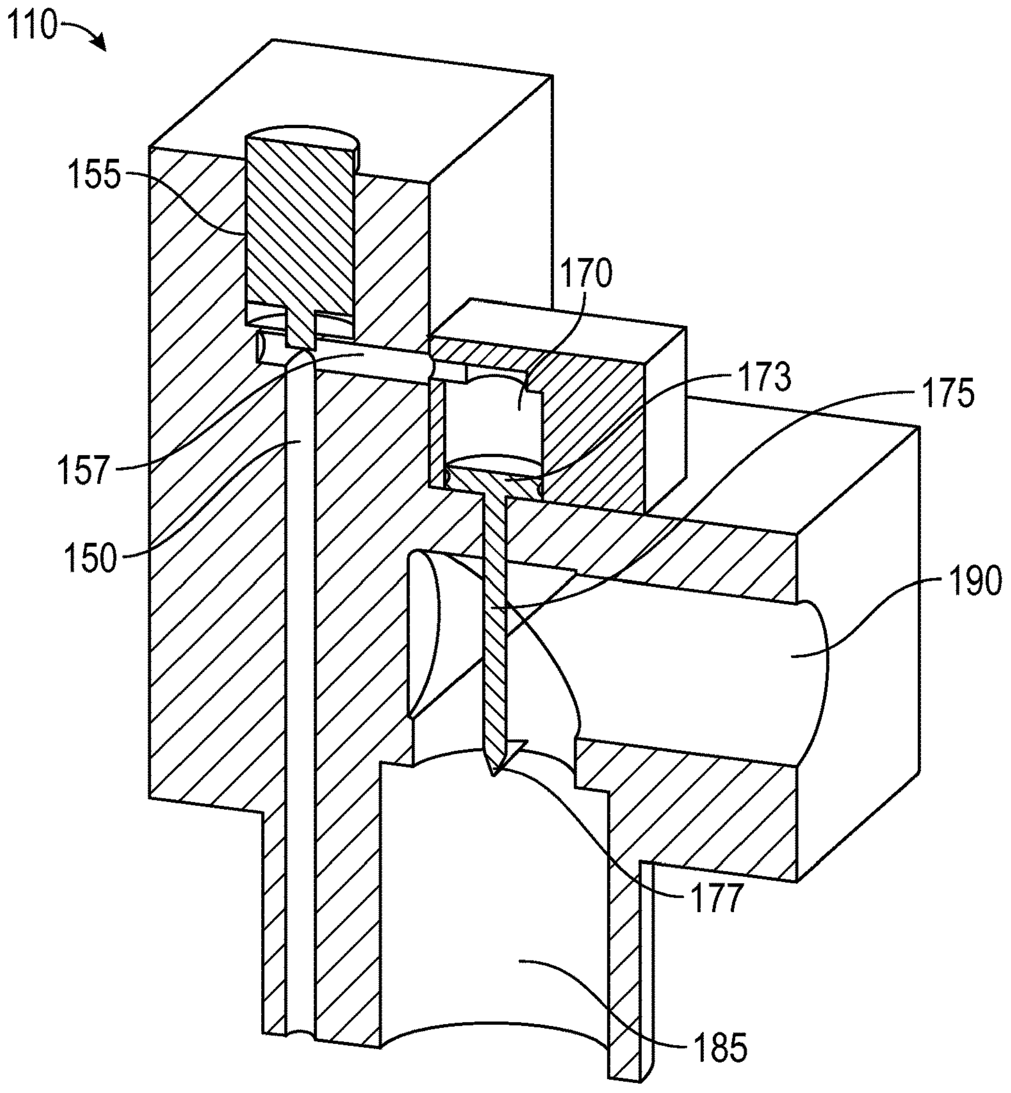
FIG. 2 is a cross-sectional view of an exemplary ullage pressure-driven valve according to one or more embodiments.

FIG. 2 shows a cross-sectional view of an exemplary ullage pressure-driven valve 110 according to one or more embodiments. The view shown in FIG. 2 is of the position of the valve 110 after the disc 180 has been burst. Thus, the solenoid valve 155 is not blocking the connection between the channel 157 to the actuation chamber 170 and the feed port 150 with ullage pressure. In addition, the piston 175 is in the deployed position where the tip 177 has burst through the disc 180. The head 173 of the piston 175 has closed off the actuation chamber 170 from the inlet port 185. Thus, fire suppression agent 125 in the inlet port 185 is directed to the outlet port 190.

Figure 3:
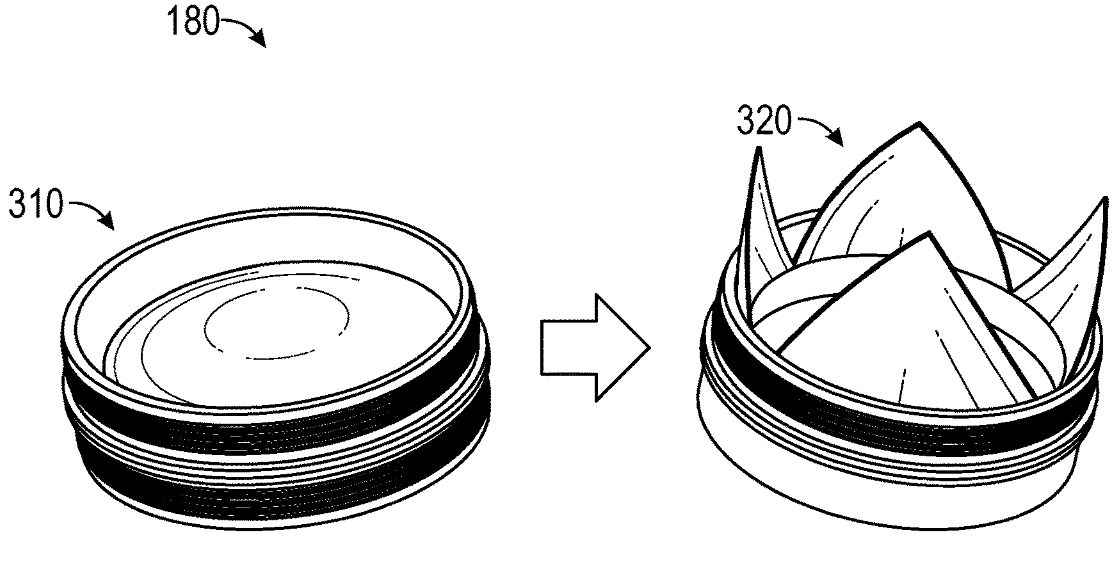
FIG. 3 shows a disc of an exemplary ullage pressure-driven valve according to one or more embodiments.

FIG. 3 shows a disc 180 of an exemplary ullage pressure-driven valve 110 according to one or more embodiments. The disc 180 is shown in the intact state 310 and in the burst state 320. As FIG. 3 indicates, in the burst state 320, the disc 180 is open to allow flow of the fire suppression agent 125.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of assembling a fire suppression system, the method comprising:

forming a feed port;

arranging a channel to couple the feed port to an actuation chamber;

configuring a solenoid valve to controllably block a connection between the feed port and the channel, wherein pressure from the feed port builds up in the actuation chamber based on the solenoid valve unblocking the connection;

arranging a piston in communication with the actuation chamber;

disposing a disc to close off an inlet port, wherein the piston is configured to travel through the inlet port and burst the disc based on the pressure in the actuation chamber; and coupling an outlet port to the inlet port;

pressurizing a container containing a volume of fire suppressant agent and ullage absent the fire suppressant agent, the container in flow communication with the feed port and the inlet port, wherein the piston is configured to be driven toward the container to initially burst the disc via pressure of the ullage on the piston when the solenoid valve unblocks the connection.

2. The method according to claim 1, wherein the forming the feed port includes arranging the feed port to be in communication with the ullage in the container.

3. The method according to claim 2, further comprising disposing a filter between the feed port and the ullage to block the material from entering the feed port.

4. The method according to claim 2, wherein the arranging the feed port includes creating a channel such that pressure from the ullage is the pressure from the feed port that is channeled to the actuation chamber.

5. The method according to claim 1, further comprising controllably coupling a siphon tube to the inlet port, wherein the disc blocks communication between the siphon tube and the inlet port and the siphon tube reaches the material in the container.

6. The method according to claim 5, wherein the controllably coupling the siphon tube includes disposing the siphon tube such that the siphon tube conveys the material from the container through the inlet port to the outlet port based on the piston bursting the disc.

7. The method according to claim 5, wherein the piston includes a tip at a first end and a head, wider than the tip, at a second end opposite the first end, and the arranging the piston includes aligning the tip to burst the disc and the head to block entry of the material from the container and through the inlet port into the actuation chamber.

8. The method according to claim 1, further comprising coupling a controller to the solenoid valve, wherein the controller is configured to provide a signal to the solenoid value to unblock the connection between the feed port and the channel.

* * * * *